United States Patent [19]

Tsuno

[11] Patent Number: 4,951,920
[45] Date of Patent: Aug. 28, 1990

[54] BACKFLOW-PREVENTING VALVES FOR INJECTION-MOLDING MACHINES

[75] Inventor: Nobuo Tsuno, Kasugai, Japan

[73] Assignee: NGK Insulators, Ltd., Nagoya, Japan

[21] Appl. No.: 249,125

[22] Filed: Sep. 26, 1988

[30] Foreign Application Priority Data

Sep. 30, 1987 [JP] Japan ................... 62-244160

[51] Int. Cl.⁵ .............................................. F16K 51/00
[52] U.S. Cl. ................................ 251/368; 251/356; 425/559
[58] Field of Search .............. 251/368, 356; 137/528; 425/559, 207, 208

[56] References Cited

U.S. PATENT DOCUMENTS

| | | | |
|---|---|---|---|
| 4,235,418 | 11/1980 | Natalizia | 251/368 |
| 4,349,044 | 9/1982 | Schirmer | 137/528 |
| 4,477,242 | 10/1984 | Eichlseder et al. | 425/207 |
| 4,529,169 | 7/1985 | Johns et al. | 251/356 |
| 4,722,679 | 2/1988 | Farrell | 425/559 |
| 4,732,364 | 3/1988 | Seger et al. | 251/368 |
| 4,763,876 | 8/1988 | Oda et al. | 251/368 |

FOREIGN PATENT DOCUMENTS 63-87002  6/1988  Japan .

*Primary Examiner*—A. Michael Chambers
*Attorney, Agent, or Firm*—Arnold, White & Durkee

[57] ABSTRACT

A backflow-preventing valve for use in a screw head of a screw injection-molding machine which has an annular shape and comprises a ceramic member is disclosed and a metallic member. At least a surface portion of a backflow-preventing valve which is brought into contact with a material to be injected and a screw groove or a valve seat is constituted by a ceramic material.

10 Claims, 2 Drawing Sheets

FIG_1a
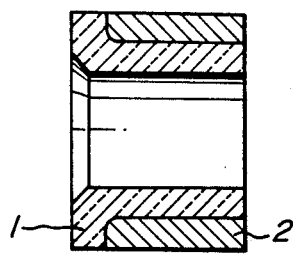
FIG_1b
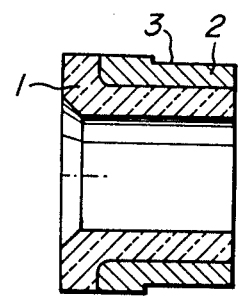
FIG_1c
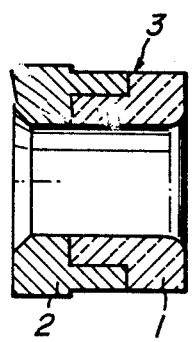
FIG_1d
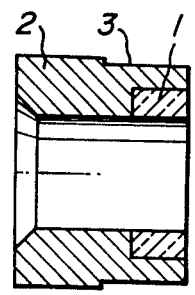
FIG_1e
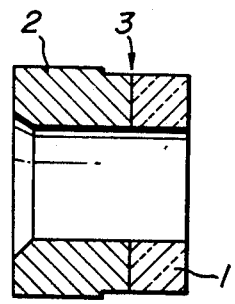

FIG._2a
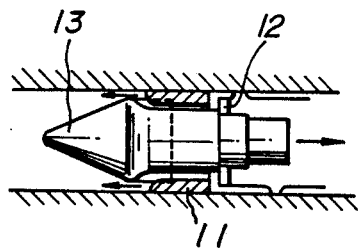
FIG._2b
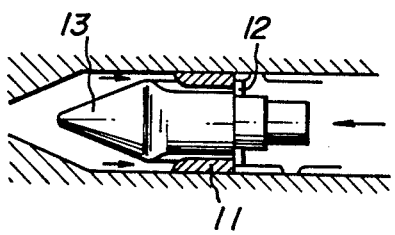

BACKFLOW-PREVENTING VALVES FOR INJECTION-MOLDING MACHINES

BACKGROUND OF THE INVENTION (1) Field of the Invention:

The present invention relates to backflow-preventing valves (back-flow ring type) to be attached to screw heads of screw type injection-molding machines for use in injection-molding thermoplastic resins or thermosetting resins. More particularly, the present invention relates to the structure of backflow-preventing valves having excellent wear resistance and corrosion resistance, in which a ceramic member and a metallic member are integrally joined together.

(2) Related Art Statement:

In the injection molding, when a molten material is injected through a nozzle, a part of the material backwardly flows along a screw grooves due to a reaction force of an injecting pressure exerted upon the material. The backflow-preventing valve serves to prevent such backflow. That is, when in use, the backflow-preventing valve (back-flow ring type) is assembled into a screw groove at a tip end of an injection-molding screw together with a valve seat, and functions as follows:

First, when the resin is metered as shown in FIG. 2(a), an end face of a backflow-preventing valve 11 is spaced from a valve seat 12. While a screw 13 retreats under rotation, the molten resin forwardly passes through the gap between the valve and the valve seat. Then, at the time of the injection molding as shown in FIG. 2(b), the screw 13 is advanced under rotation, and the backflow-preventing valve 11 is rearwardly pushed due to the reaction force of the molten resin. Consequently, the end face of the backflow-preventing valve 11 adheres closely to the valve seat 12 to prevent the backflow of the resin.

As a material constituting the backflow-preventing valve, various kinds of treated steels such as alloy steels, stainless steel, Hastelloy, Stellite coated steels or the like have conventionally been used.

Recently, since filler-containing resins or heat-resisting resins have frequently been used as materials to be injection-molded, wear-resistant materials or corrosion-resistant materials have come to be necessary for screw head-constituting members in the injection-molding machines.

Further, the inside of a nozzle of an injection-molding machine is subjected to high temperatures around 300° C. and high pressures of not lower than 1,000 kg/cm$^2$. Therefore, use of corrosion-resistant, heat-resistant materials having high strength has been demanded.

However, the conventional material constituting the backflow-preventing valves, has drawbacks in that the material cannot withstand wearing caused when the valve rotates while being pushed to the valve seat during the injection molding, or that they cannot withstand corrosion and wearing when the valves are pushed against a strongly corrosive resin at high temperatures and high pressure. Therefore, the conventional materials have problems in that the backflow-preventing valves need to frequently be exchanged, and that operation efficiency is poor.

Since a metallic material, which can be applied to all sorts of resins is unavailable, it is necessary that screws and backflow-preventing valves made of various materials are prepared to meet various kinds of resins to be injection molded, and every time the kind of resin is changed, the screw and the backflow-preventing valve are also exchanged. Thus, operation efficiency drop remarkably.

In order to solve the above problems, it may be considered that backflow-preventing valves are made of a ceramic material having better heat resistance and corrosion resistance as compared to the metallic materials. However, the ceramic material has poorer toughness than the metallic materials. Thus, if a backflow-preventing valve is made of such a ceramic material only, the valve may be broken and not practically used.

SUMMARY OF THE INVENTION

It is an objective of the present invention to solve the above-mentioned problems, and to provide a backflow-preventing valve which is to be used in an injection molding machine and which has excellent wear resistance, corrosion resistance, heat resistance and strength.

The backflow-preventing valve according to the present invention for the injection molding machine is to be used in a screw head of a screw type injection molding machine, and is characterized in that the backflow-preventing valve has an annular shape constituted by a ceramic member and a metallic member, and that at least a part of a surface of the backflow-preventing valve which contacts a material to be injection molded, a screw groove, or a valve seat is made of a ceramic material.

In the above construction, a portion of the valve which rotates during the injection molding while being pushed against the seat valve or the screw groove under high pressure and/or which contacts with a resin at high temperatures and high pressures is made of the ceramic material. Thereby, wear resistance, corrosion resistance, heat resistance and high strength, required for backflow-preventing valves, can be attained.

These and other objects, features and advantages of the invention will be appreciated upon reading the following description of the invention when considered in conjunction with the attached drawings, with the understanding that some modifications, variations, and changes of the same could be made by a skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1(a) through (e) are sectional views of embodiments of the backflow-preventing valves according to the present invention; and FIGS. 2(a) and (b) are views of illustrating the function of the backflow-preventing valve.

DETAILED DESCRIPTION OF THE INVENTION

As a ceramic material used in the present invention, use may be made of silicon nitride, silicon carbide, sialon, zirconia, alumina, mullite or the like. The kinds of ceramic material which should be used may be determined depending upon the kind of resin to be injection molded or the kind of metallic material which constitutes the backflow-preventing valve. When thermal properties or mechanical properties of the ceramic material are taken into consideration, it is preferable to use silicon nitride, zirconia or sialon, and it is more preferable to use zirconia or silicon nitride. More particularly, zirconia is most preferable, because zirconia has a coefficient of thermal expansion near those of steel materials, and also possesses excellent heat insulating properties.

The metallic material to be joined to the ceramic member may be selected based upon the kind of the resin to be injection molded or the material constituting the ceramic member to be joined thereto. It is preferable to select a metallic material having a coefficient of thermal expansion as near as possible to that of the ceramic material. As such a metallic material, use may be made of nitriding steels, nickel chrome molybdenum steels, ferritic stainless steels, precipitation-hardenable type stainless steels, precipitation-hardenable type supper alloys, maraging steels, or the like.

As a way of joining the ceramic member to the metallic member, fitting such as shrinkage fitting, expansion fitting, press fitting or the like, or brazing may be used. Selection of the fitting or the brazing as the joining way may be determined depending upon the shapes of the ceramic member and the metallic member or kinds of the materials to be combined.

When the joining is effected by press fitting, it is preferable to effect the press fitting at temperatures higher than a usable temperature to prevent slipping out of the metallic member. However, when the metallic material is a precipitation-hardenable type alloy, it is preferable to effect press fitting at temperatures lower than a precipitation-starting temperature, and the press fitting is preferably effected at room temperature. The press fitting temperature is unfavorably higher than the precipitation-starting temperature, because biting occurs at a press fitting face of the metallic member. When joining is effected by brazing, either one of the following two methods may be employed:

That is, a metallic film layer is formed, through a, metallizing treatment, on a surface of the ceramic member to be bonded, and is brazed to the metallic member (metallizing process). Alternatively, the ceramic member is directly brazed to the metallic member with an active metallic brazing material (active metal method).

Selection of either one of these methods may be determined depending upon the kind of the ceramic material. When the ceramic material is made of an oxide type ceramic, the metallizing method and the active metal method may both be used. When the ceramic material is made of a non-oxide type ceramic, the active metal method is suitable.

Since the backflow-preventing valve needs to rotate in a temperature environment near 300° C. under a pressure of 1,000 kg/cm$^2$, a joining portion between the ceramic member and the metallic member is required to have high strength and heat resistance.

For this purpose, a known metallizing method may be used, and use of a metallizing process disclosed in Japanese patent publication No. 60-6,910 is particularly preferred.

As the active metal method, it is particularly desirable that an active metal brazing material in which titanium is vapor deposited upon a silver solder plate is used, and a ceramic member and a metallic member are brazed together with the silver solder plate, so that among joining layers existing between the ceramic member and the metallic member, the one adjacent to the ceramic member is composed of an alloy which contains at least 5 to 50% by weight of nickel, 30 to 70% by weight of silver, 15 to 40% by weight of copper, and 1 to 10% by weight of titanium.

The present invention will be explained in more detail with reference to the attached drawings.

In FIGS. 1(a) through (e) are given sectional views of embodiments of the backflow-preventing valves according to the present invention.

In the embodiment of FIG. 1(a), a cylindrical ceramic member 1 has a smaller diameter portion and a larger diameter portion at an outer periphery thereof, and a cylindrical metallic member 2 is joined around the outer-periphery of the smaller diameter portion of the ceramic member 1. The joining between the ceramic member 1 and the metallic member 2 may be either fitting or bonding. In this embodiment, a portion of the valve which is brought into contact with a valve seat and a resin is made entirely of the ceramic member 1.

In the embodiment shown in FIG. 1(b), an escape portion 3 is formed around the outer periphery of a metallic member 2 of the backflow-preventing valve as shown in FIG. 1(a). The escape portion 3 functions to offset an internal pressure of the resin acting upon the backflow-preventing valve during injection molding.

In the embodiment of FIG. 1(c), a cylindrical ceramic member 1 has a larger diameter portion and a smaller diameter portion at the outer periphery thereof, and a cylindrical metallic member 2 has a larger diameter portion and a smaller diameter portion at the inner periphery thereof. The ceramic member 1 and the metallic member 2 are joined together between the smaller diameter portion of the former and the larger diameter portion of the latter. Both members may be joined by either fitting or bonding. In this embodiment, a portion of the valve which is brought into contact with the resin is partially constituted by the ceramic member 1.

In the embodiment of FIG. 1(d), a cylindrical metallic member 2 has a larger diameter portion and a smaller diameter portion at the inner periphery thereof, and a cylindrical ceramic member 1 is inserted and joined to the larger diameter portion of the metallic member. In this embodiment, a portion of the valve which is brought into contact with the resin is partially constituted by the ceramic member 1.

In the embodiment of FIG. 1(e), a cylindrical ceramic member 1 is joined to a metallic member 2 at their end surfaces. Both members are joined together by plating nickel on a surface of the metallic member to be joined, arranging, between the surfaces of the members to be joined, an active metal brazing material in which titanium is vapor deposited in a thickness of 2.5 μm onto one side surface of a 0.1 mm thick silver solder sheet to form an assembly to be joined, and brazing the assembly by heating in a vacuum. In this embodiment, as the ceramic member, $Y_2O_3$-containing zirconia having an outer diameter of 35 mmΦ, an inner diameter of 15 mmΦ, and a thickness of 7 mm is used, while Incoloy 903 having an outer diameter of 35 mmΦ, an inner diameter of 15 mmΦ, and a thickness of 20 mm is used as the metallic member.

As is clear from the aforegoing explanation, since in the backflow-preventing valve according to the present invention, a portion of the valve which is brought into contact with the resin at high temperatures and high pressures, the screw groove, or the valve seat is constituted by the ceramic member having excellent heat resistance, corrosion resistance, wear resistance or high temperature strength, the backflow-preventing valve is not worn even when a highly abrasive resin such as a resin containing a filler or a highly corrosive resin is injection molded. Thus, the valve can be used stably for a long period of time. Further, since the backflow-preventing valve according to the present invention has a composite structure consisting of the ceramic member and the metallic member, it is not feared that the valve is broken due to poor toughness of the ceramic material. Thus, the valve can withstand use for an extended period of time.

As mentioned above, since the backflow-preventing valves according to the present invention need not be exchanged depending upon the kind of the resin, operation efficiency can be improved remarkably.

What is claimed is:

1. An annular backflow-preventing valve for use in a screw head of a screw type injection-molding machine, comprising:
   an annular ceramic member having a first end for accommodating an injection-molding screw therein and a second end opposing said first end; and
   an annular metallic member disposed on an outer peripheral surface of said ceramic member at said second end thereof;
   wherein said first end of said ceramic member constitutes an entire injection-molding screw receiving end of said valve and said ceramic member defines an entire inner peripheral surface of said valve.

2. The annular backflow-preventing valve of claim 1, wherein an escape portion is formed in a part of an outer peripheral surface of said valve.

3. An annular backflow-preventing valve for use in a screw head of a screw type injection-molding machine, comprising:
   an annular metallic member at a first end of said valve for accommodating an injection-molding screw therein; and
   an annular ceramic member at a second end of said valve opposing said first end of said valve, abuttingly joined to said metallic member;
   wherein said metallic member at said first end constitutes an entire injection-molding screw receiving end of said valve and said ceramic member at said second end constitutes an entire opposing end of said valve.

4. The annular backflow-preventing valve of claim 3, wherein an escape portion is formed in a part of an outer peripheral surface of said valve.

5. An annular backflow-preventing valve for use in a screw head of a screw type injection-molding machine, comprising:
   an annular metallic member having a first end for accommodating an injection-molding screw therein and a second end opposing said first end; and
   an annular ceramic member disposed on an inner peripheral surface of said metallic member at said second end thereof;
   wherein said first end of said metallic member constitutes an entire injection-molding screw receiving end of said valve.

6. The annular backflow-preventing valve of claim 5, wherein an escape portion is formed in a part of an outer peripheral surface of said valve.

7. A backflow-preventing valve for use in a screw head of a screw-type injection-molding machine, said backflow-preventing valve having an annular structure and comprising a ceramic member and a metallic member brazed together, wherein at least a surface portion of the backflow-preventing valve which contacts a material to be injected comprises a ceramic material, and among joining layers existing between the ceramic member and the metallic member a joining layer adjacent the ceramic member comprises an alloy of: 5 to 50 % by weight of nickel; 30 to 70 % by weight of silver; 15 to 40 % by weight of copper; and 1 to 10 % by weight of titanium.

8. A backflow-preventing valve for use in a screw head of a screw type injection-molding machine, said backflow-preventing valve having an annular structure and comprising:
   a ceramic member and a metallic member brazed together; and
   an escape portion formed in a part of an outer peripheral surface of backflow-preventing valve;
   wherein at least a surface portion of the backflow-preventing valve which contacts a material to be injected comprises a ceramic material and among joining layers existing between the ceramic member and the metallic member a joining layer adjacent the ceramic member comprises an alloy of: 5 to 50 % by weight of nickel; 30 to 70 % by weight of silver; 15 to 40 % by weight of copper; and 1 to 10 % by weight of titanium.

9. A backflow-preventing valve for use in a screw head of a screw type injection-molding machine, said backflow-preventing valve having an annular structure and comprising a ceramic member and a metallic member brazed together, wherein the entire surface portion of the backflow-preventing valve, which contacts a material to be injected and a valve seat, comprises a ceramic material, and among joining layers existing between the ceramic member and the metallic member a joining layer adjacent the ceramic member comprises an alloy of: 5 to 50 % by weight of nickel; 30 to 70 % by weight of silver; 15 to 40 % by weight of copper; and 1 to 10 % by weight of titanium.

10. A backflow-preventing valve for use in a screw head of a screw type injection-molding machine, said backflow-preventing valve having an annular structure and comprising:
   a ceramic member and a metallic member brazed together; and
   an escape portion formed in a part of an outer peripheral surface of the backflow-preventing valve;
   wherein the entire surface portion of the backflow-preventing valve which contacts a material to be injected and a valve seat comprises a ceramic material, and among joining layers existing between the ceramic member and the metallic member a joining layer adjacent the ceramic member comprises an alloy of: 5 to 50 % by weight of nickel; 30 to 70 % by weight of silver; 15 to 40 % by weight of copper; and 1 to 10 % by weight of titanium.

* * * * *